United States Patent [19]

Savipakka et al.

[11] Patent Number: 5,184,451
[45] Date of Patent: Feb. 9, 1993

[54] LAWN MOWER

[75] Inventors: Raimo Savipakka; Eero Poussu; Markku Poussu, all of Riihimäki, Finland

[73] Assignees: Raimo Savipakka; Eero Poussu, both of Riihimäki, Finland

[21] Appl. No.: 767,826

[22] Filed: Sep. 30, 1991

[51] Int. Cl.⁵ ............. A01D 34/68; A01D 34/73; A01D 34/82; A01D 67/00

[52] U.S. Cl. ..................... 56/17.5; 56/295; 56/320.1

[58] Field of Search ............ 56/320.1, 320.2, 16.7, 56/17.4, 17.5, 295

[56] References Cited

U.S. PATENT DOCUMENTS

| | | | |
|---|---|---|---|
| 3,212,244 | 10/1965 | Wilgus | 56/320.1 X |
| 3,729,912 | 5/1973 | Weber | 56/320.1 |
| 4,312,421 | 1/1982 | Pioch | 56/320.1 |
| 4,887,420 | 12/1989 | Cerny, Jr. et al. | 56/320.1 X |

FOREIGN PATENT DOCUMENTS

| | | |
|---|---|---|
| 2249077 | 10/1972 | Fed. Rep. of Germany ..... 56/320.1 |
| 2314401 | 3/1973 | Fed. Rep. of Germany ..... 56/320.1 |

*Primary Examiner*—Stephen J. Novosad
*Attorney, Agent, or Firm*—Morton J. Rosenberg; David I. Klein

[57] ABSTRACT

The invention relates to a lawn mover, comprising a body portion (1), a power unit (14) mounted on the body portion, and blade members (2), rotating substantially in a horizontal plane and fixed to the lower end of a substantially vertical driving shaft (10) inside a cutting chamber (12) provided by body (1). The inner surface of said cutting chamber (12) in body portion (1) is provided with a material (15) having a low friction coefficient. The power unit (14) preferably comprises a permanent magnet direct-current motor. Blade members (2) are made of a sheet-like material. The blade member mounted on either side of said driving shaft (10) of blade (2) is, from its end and over part of its length, designed in a manner such that, as seen in its rotating direction, the leading edge of the blade lies at a level substantially lower than the rest of the blade. The plane of rotation defined by said lower leading edge is located approximately 10-15 mm above the bottom edge of cutting chamber (12).

2 Claims, 2 Drawing Sheets

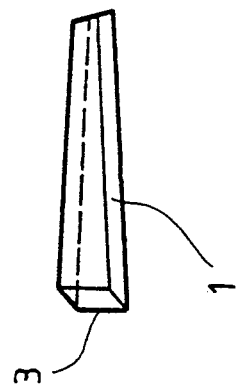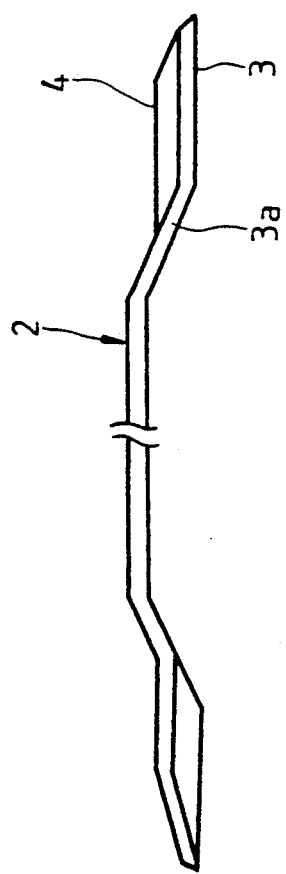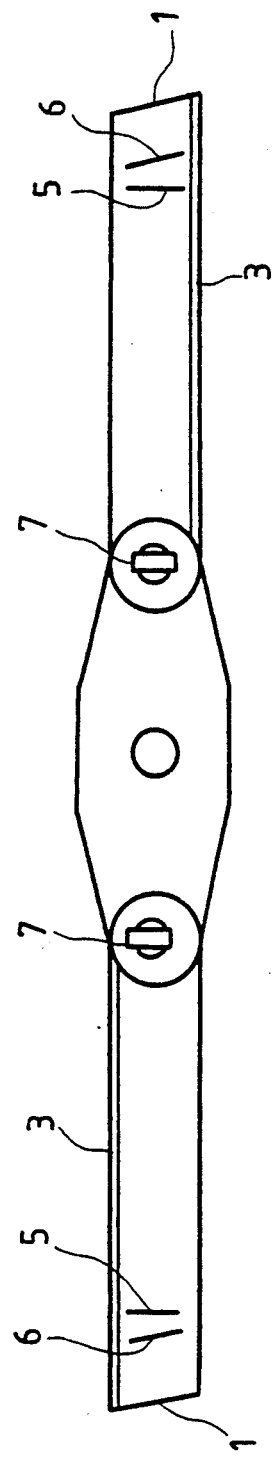
FIG. 3c
FIG. 3a
FIG. 3b

LAWN MOWER

BACKGROUND OF THE INVENTION

The present invention relates to a power-unit operated lawn mower as set forth in the preamble of claim 1.

Normally the source of power in lawn mowers is an internal combustion engine whose drawbacks include e.g. noise, smoke, smell as well as handling of petrol and oil and jerking of a string for starting the engine. The output of such combustion engines is usually 3-4.5 horsepower (2.2-3.3 kw). The practical realization of a battery-operated lawn mower having a corresponding output is impossible, since the mass of required batteries would be several tens of kilograms. One indication of this is that there are no mass produced battery-operated lawn mowers on the market as yet. Attempts have been made to avoid the above problem by using electric motors running on mains current. A problem with these are, however, inconvenient handling of the mains cord and a hazard of damaging the cord.

SUMMARY OF THE INVENTION

An object of the invention is to provide a lawn mower, wherein the friction caused by cut grass is made as low as possible which also results in a relatively good sound insulation. Such creation of a low friction also provides for the manufacture of an economically competitive battery-operated lawn mower, which is applicable as an industrial product and in which the above problems can be eliminated. In order to achieve the above object, a lawn mower of the invention is characterized in that the inner surface of a cutting space in the body portion is provided with a material having a low friction coefficient. Examples of such material include e.g. PE, POM, PTFE, PA. The low friction layer is preferably formed as a relatively thin film layer which is resiliently fixed to the body portion for subjecting it during the operation to an appropriate vibration so as to facilitate the removal of grass from the surface of said friction layer.

The low friction film is fixed to the body portion preferably through the intermediary of a sound-proofing layer. When a lawn mower of the invention is constructed as a battery-operated apparatus, the power unit preferably comprises a permanent magnet direct-current motor. The blade members are preferably made of a sheet-like material, whereby a blade member on each side of a blade driving shaft is designed over part of its length in a manner that, as viewed in the rotating direction, the leading edge of a blade is substantially lower than the rest of the blade. A combined effect of these solutions and an appropriate design of the blade chamber results in energy consumption which is appr. 70% lower than in conventional lawn mowers. The above aspects bear a substantial effect on the dimensions of a motor and a set of batteries. The motor is preferably dimensioned to operate over the portion of a performance curve having the best efficiency. The set of batteries is preferably dimensioned to provide a reasonable operating time (average 1.5 h). By combining the technical solutions of a set of batteries, a motor, blade members and a body portion it is possible to manufacture a battery-operated lawn mower having a total weight substantially in the same category as that of conventional lawn mowers.

An advantage gained by a permanent magnet direct-current motor is that its power take-off complies with a loading in an effort to maintain the speed of rotation within a relatively narrow range of rotating speeds. Thus, the energy consumption can be minimized as far as the motor is concerned. In addition, the device of the invention may employ relatively high speeds of blade rotation, e.g. within the range of appr. 2500-3500 RPM, which makes it possible to cut down the blade angle and thus to reduce air drag. Furthermore, as a result of the blade design, the friction against cut grass is reduced, since only the blade end portion comes into contact with grass while the rest of the blade lies above the plane of the cut grass. This reduction of friction against cut grass as well as reduction of air drag when compared to the normal blade design used in a conventional combustion-engine equipped machine adds to the reduction of energy consumption. Furthermore, the use of a material having a low friction coefficient on the inner surface of a blade chamber according to the invention substantially prevents the grass from sticking to said surface, which is another factor to cut down energy consumption and to facilitate cleaning of the device. In addition, by fixing a friction low layer resiliently to the body portion, the latter can be subjected to an appropriate vibration during the operation for further facilitating the removal of grass from the surface of the low friction layer. The low friction layer is preferably formed as a relatively thin film layer whose material can be e.g. PE, PMO, PTFE or PA. Another benefit gained by the use of a low friction layer is its constribution towards the reduction of sound build-up.

In a preferred embodiment of the invention, the sound suppression is intensified by using a sound-absorption layer between the low friction layer and the body portion. Thus, the interfaces between these layers of different materials assist in the absorption of sound.

In another further embodiment of the invention, as viewed in the machine pushing direction, the forward and rearward portions of a blade chamber in the body are provided with openings for allowing the passage of cut grass through the machine when pushing as well as pulling the machine. The use of these openings prevents the accumulation of grass underneath the machine and, thus, reduces the consumption of energy.

In yet another embodiment of the invention, the blade chamber of the body is provided with an outlet for passing the cut grass into a collecting chamber, which may comprise e.g. a removable bag allowing an air flow therethrough. In this case, the blade structure can be fitted with a fan member which facilitates blowing of the cut grass and other debris through said outlet and into said collecting chamber. As viewed in the machine pushing direction, said outlet is located in the rearward portion of the machine and in the top section of the blade chamber.

The most important advantages gained by a device of the invention include the facts that it is simple to operate, requires little maintenance, is non-pulluting and has a quiet running sound.

BRIEF DESCRIPTION OF THE DRAWINGS

The invention will now be described with reference made to the accompanying drawings, in which

FIG. 3a to 3c illustrate the design of a cutting blade used in a lawn mower of the invention in a side, plan and end view, respectively.

DETAILED DESCRIPTION OF THE PREFERRED EMBODIMENTS

Figure 1:
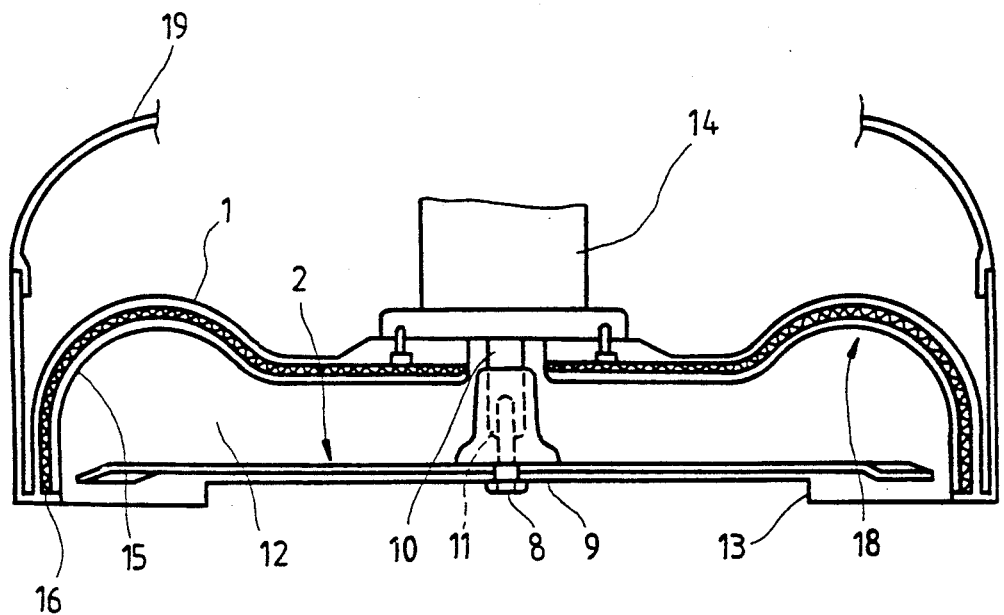
FIG. 1 is a sectional front view of the body portion of a lawn mower of the invention.
Figure 2:
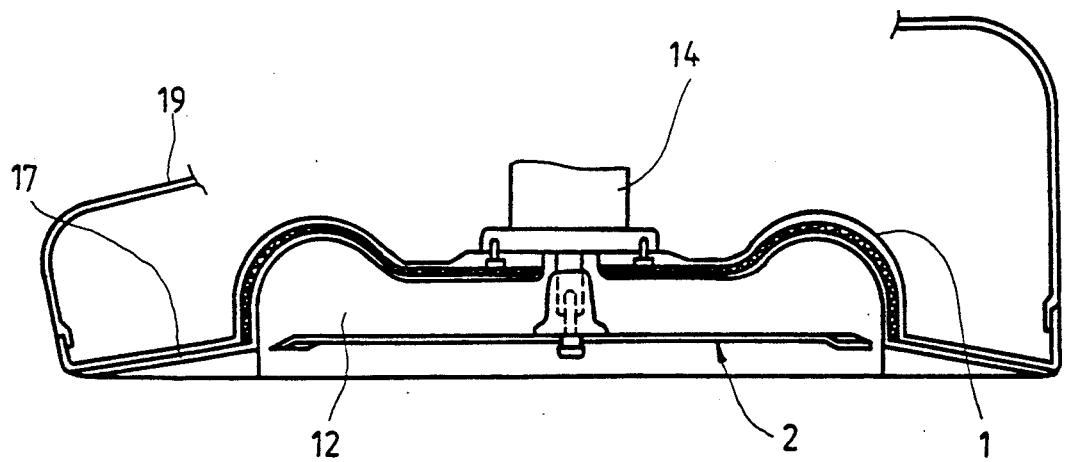
FIG. 2 shows a side view of the body portion of a lawn mower shown in FIG. 1.

As shown in FIGS. 1 and 2, a lawn mower of the invention includes a body portion 1 on top of which is mounted a motor 14 with its driving shaft 10. For the sake of clarity the figures do not illustrate the wheels and pushing rod included in a lawn mower. Motor 14 comprises a permanent magnet direct-current motor with an operating voltage preferably 24 V, a speed of rotation 3200 RPM and a nominal output 420 W. Body 1 provides a blade chamber 12, inside which a cutting blade 2 is set and fixed to the lower end of driving shaft 10 in a manner that the lowest level of rotation lies about 10–15 mm above the bottom rim of blade chamber 12. The mounting of blade 2 is effected e.g. by means of a mounting block 11 and a fixing screw 8. In addition, between fixing screw 8 and blade 2 is preferably fitted a safety member 9 which, if a blade loading increases too much, allows the blade to slide in its mounting. Safety member 9 can be e.g. a spring washer or a like. The inner surface of blade chamber 12 is coated with a low friction coefficient material layer (low friction layer) 15, the material being e.g. PE, POM, PTFE (teflon) or PA (nylon). This coating layer 15 prevents the accumulation of grass on the walls, thus having its share in reducing the consumption of energy. Between body 1 and said inner surface layer 15 is further lined a sound-insulating material layer, e.g. cellular plastics or cellular rubber. The power source of motor 14 comprises preferably two 12 V/24 Ah-batteries (not shown), which are preferably mounted behind motor 14 as seen in the pushing direction of a lawn mower for distributing more weight on rear wheels (not shown) for facilitating the use of a lawn mower. The batteries employed are preferably standard production batteries having a reduced sheet surface area and a reduced amount of electrolyte for reducing the momentary maximum current provided by the battery from a normal of about 100 A to about 30–40 A, while the storage capacity of the battery nevertheless retains its nominal value, the same applying also to the voltage supplied by the battery.

One preferred blade structure used in a lawn mower of the invention is best shown in FIG. 3a–3c. According to these figures, a blade 2 is designed from each end over a portion of its length in a manner that, as viewed in the blade rotating direction, the leading edge 3 lies substantially lower than the trailing blade edge 4 of the corresponding portion. This design can be achieved for example by bending said blade 2 along folding lines 5 and 6 shown in FIG. 3b to a desired bend angle. Thus, the leading blade edge 3 merges by way of a transition portion 3a with the leading edge of the bent remaining portion of the blade. In the non-bent portion of the blade, the leading and trailing blade edges are preferably substantially level with each other.

The blade has its end portion 7 preferably designed to be bevel in a manner that the point portion of trailing blade edge 4 is closer to driving shaft 10 than the point portion of leading blade edge 3. The blade has its portion 7 preferably designed flexible joint. This design protect the motor shaft for damage in the accident situation. The blade cutting parts are easy to maintain and change.

The shaping of a blade can also be achieved by the application of other conventional manufacturing methods, e.g. forging, casting, riveting and welding. Blade 2 is preferably sharpened along its entire leading edge all the way to the mounting point of flexible joint 7. The above-described blade design causes the cut grass to rise upwards and to fall down over the straight blade portion, wherein the grass is cut further into more finely chopped mash, i.e. the blade operates as a so-called bio-cutter. This action is further facilitated by designing blade chamber 12 of body 1 in a manner that the upper portion of said blade chamber, its peripheral region, will be provided with a substantially circular channel portion 18 having a cross section shaped like a circular arc, at least some of said channel portion 18 extending higher than the rest of the blade chamber.

In order to prevent the accumulation of cut grass in front of and inside the lawn mower, the body portion 1 is provided with openings 13 passing into the cutting chamber and facing forward and rearward, in the machine pushing direction. The upper rim of each opening 13 lies substantially below the rotating level of the blade. The width of said opening is preferably about ¾ of the length of blade 2. For example, if the length of blade 2 is appr. 420 mm, the width of opening 13 will be preferably appr. 300 mm. The accumulation of grass is further prevented by using inclined safety guards 17 mounted on opening 13 and extending from body portion 1 forward and respectively rearward (FIG. 2), the inner surface of said safety guards being made of the same material as the inner surfaces of blade chamber 12. A lawn mower of the invention is also fitted with a cover member 19 which preferably extends upwards from the forward region of the leading safety guard 17 and over motor 14 down to the forward region of the trailing safety guard. The cover member is preferably made of the same material as body portion 1, said material possibly being e.g. ABS plastics, light metal etc.

A lawn mower of the present invention can also be constructed as a battery-operated unit by fitting the device with pick-up means for collecting the cut grass. Thus, said blade chamber 12 is provided with an outlet which leads to a separate, removable collecting tank. In this case, the mounting block 11 of blade 2 is replaced with blowing means for discharging the cut grass and other possible debris through said outlet into the collecting vessel. The use of such blowing means increases the consumption of energy to some extent and this can be compensated for e.g. by employing a relatively short total blade length, e.g. appr. 380 mm.

The above embodiments are only intended for illustrating some preferred examples of carrying out the invention and are by no means intended to limit the scope of protection defined in the annexed claims.

We claim:
1. An electrically powered lawnmower, comprising:
a body portion (1) having a laminated structure, said laminated structure being defined by a sound absorption layer (16) disposed between an outer layer and an inner thin film layer (15), said inner thin film layer (15) being disposed on an interior surface of a cutting chamber (12) defined by said body portion (1), said inner thin film layer (15) being formed of a material composition having a low friction coefficient selected from the group consisting of polyethylene, Teflon, and Nylon, said thin film layer (15) being resiliently coupled to said sound absorption layer (16), whereby said thin film layer is free to vibrate and thereby facilitate displacement of grass debris therefrom;

an electric motor (14) fixedly coupled to said body portion (1) and having a driving shaft (10) extending vertically into said cutting chamber (12), said electric motor (14) being adapted for selective electrical coupling to a battery-type power source;

a cutting blade (2) secured to said driving shaft (10) within said cutting chamber (12) for rotation therewith, said cutting blade (2) having a predetermined contour for reducing cutting friction defined by: (a) a central substantially flat portion establishing a first horizontal plane, and (b) a pair of opposing end portions offset from said first horizontal plane to establish a second horizontal plane, said second horizontal plane being disposed below said first horizontal plane, each of said pair of opposing end portions being contoured by a sharpened leading edge (3) disposed below a trailing edge (4) of said cutting blade (2) to thereby cut grass with only said end portions of said cutting blade (2), whereby reduced friction of said inner thin film layer (15) and reduced cutting friction of said cutting blade (2) combine to reduce energy consumption of said electric motor (14).

2. The electrically powered lawnmower as recited in claim 1 where said electric motor (14) operates at a rotational speed in the approximating range of 2500-3500 RPM.

* * * * *